Jan. 14, 1930.   H. M. SMITH ET AL   1,743,164
AUTOMOBILE HEATING APPARATUS
Filed Feb. 25, 1929   2 Sheets-Sheet 1
Fig. 1
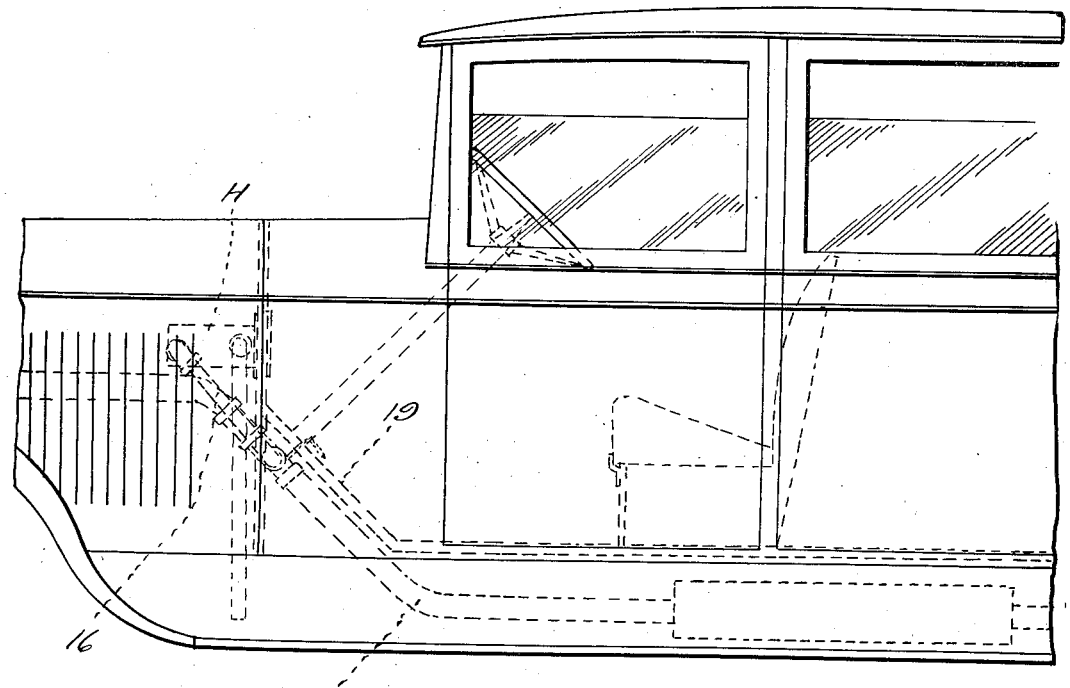
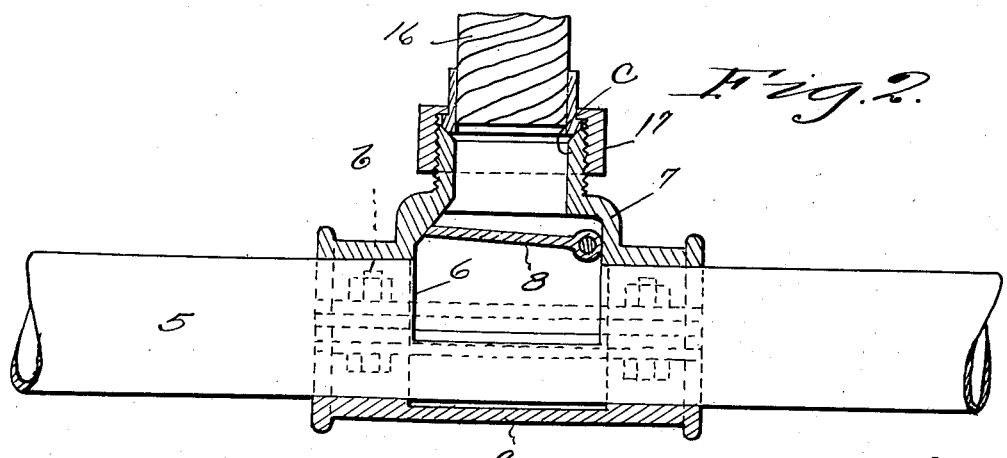
Fig. 2
Inventor
H. M. Smith
J. W. Farmer
By Clarence A. O'Brien
Attorney

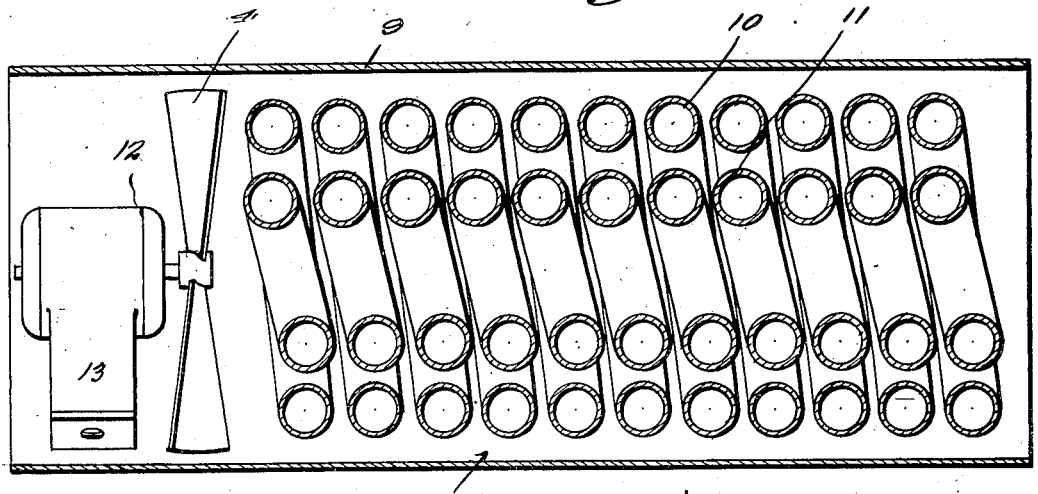
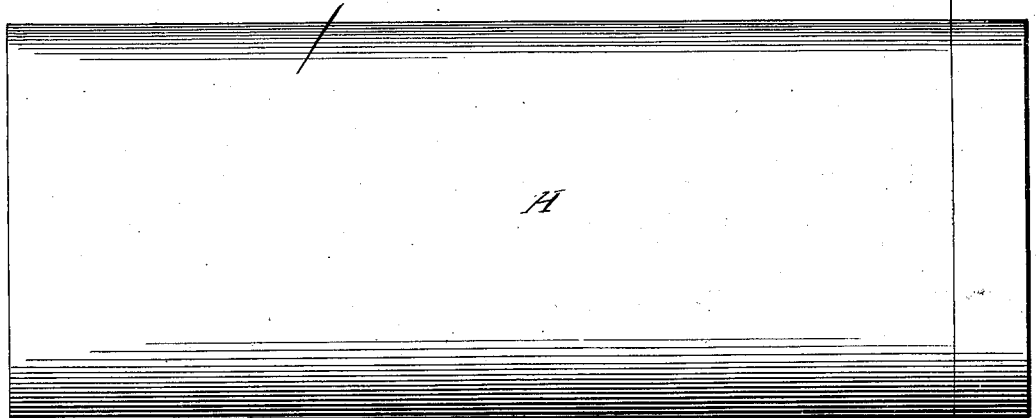
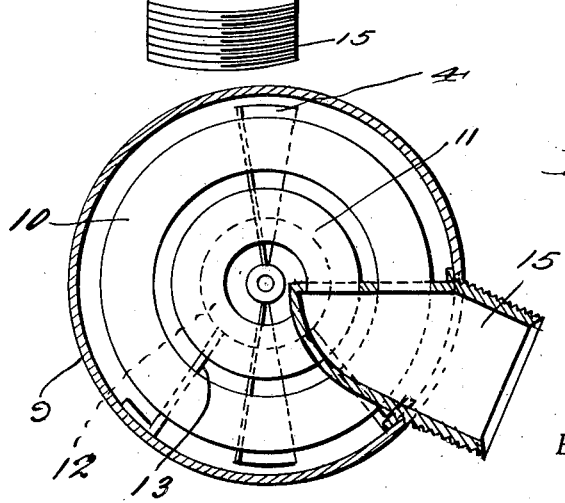

Patented Jan. 14, 1930

1,743,164

UNITED STATES PATENT OFFICE

HARLAN M. SMITH AND JOHN W. FARMER, OF MINNEAPOLIS, MINNESOTA

AUTOMOBILE HEATING APPARATUS

Application filed February 25, 1929. Serial No. 342,492.

The present invention relates to an automobile heating apparatus and has for its prime object to provide a structure whereby the exhaust gases may be utilized for heating an automobile in an effective manner whenever needed.

Another very important object of the invention resides in the provision of a heating apparatus of this nature wherein the exhaust gases pass through a pair of coils one within the other, said coils being located in a chamber in conjunction with a forced air circulation.

A still further very important object of the invention resides in the provision of a heating apparatus of this nature which is simple in its construction, compact and convenient in its arrangement of parts, inexpensive to manufacture, easy to control, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a fragmentary side elevation of an automobile body indicating the arrangement of our apparatus therein, Figure 2 is an enlarged detail view of the combination valve and coupling showing the same in section on the exhaust pipe, Figure 3 is a longitudinal section through the heater, Figure 4 is a side elevation thereof, and Figure 5 is a transverse section therethrough taken substantially on the line 5—5 of Figure 4.

Referring to the drawing in detail it will be seen that the numeral 5 denotes an exhaust pipe of an automobile which is provided with an exhaust pipe of an automobile which is provided with an opening 6. A T-coupling 7 is disposed about the exhaust pipe 5, the branch $a$ being formed in sections for this purpose held together by bolt $b$ so that branch $c$ registers with and extends from the opening 6. A valve 8 is incorporated with the coupling 7 so as to shut off the branch $c$ in the position shown in Figure 2 so that it may be swung downwardly to cause the exhaust gases to pass through the branch $c$.

The heater is denoted generally by the letter H and comprises a cylindrical body 9 open at its end and having located therein two coils 10 and 11, the latter being within the former. Also located in the front end of this cylinder 9 is an electric motor 12 supported in brackets 13 and having on the armature shaft thereof a fan 14 for blowing a draft of air through the cylinder 9 and the coils 10 and 11.

Coupling members 15 extend through openings in the cylinder 9 one a distance from the forward end thereof and the other at the rear end thereof and the terminals or ends of the coils 10 and 11 terminate therein as is clearly illustrated in Figure 5.

A flexible or other conductor 16 is coupled as at 17 with the branch $c$ of the coupling 7 and is suitably engaged with the coupling 15 adjacent the fan 14 that is adjacent the forward end of the cylinder or chamber 9. A suitable conductor 19 is coupled with the other coupling 15 and leads to the rear of the automobile.

From the above detailed description it will be seen that when the valve 8 is in an open position so as to cause the exhaust gases to pass through the branch $c$, said exhaust gases pass through the coils and the drafts of air passing over and through these coils is directed into the automobile body.

It is preferable to have the heater located in the dash board of the automobile and to have the coupling 7 located in the exhaust pipe 5 as near as possible or convenient to the heater. The valve 8 may be controlled from inside the car by any suitable means. If it is desired to heat the car up quickly the electric motor 12 may be started so that the fan 14 assists in directing the draft through the car. Of course the fan will be used also when the car is not moving.

It is thought that the construction, utility, operation and advantages of this invention will now be quite apparent to those skilled in this art without a more detailed description thereof. The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described our invention, what we claim as new is:

1. A heating apparatus of the class described for automobiles comprising an elongated cylindrical chamber, a pair of coils arranged longitudinally in the chamber one within the other, an exhaust pipe with an opening, a coupling over the exhaust pipe and having a branch leading from the opening, a valve associated with said branch, a conductor, means operatively connecting the conductor with the coils.

2. A heating apparatus of the class described for automobiles comprising an elongated cylindrical chamber, a pair of coils arranged longitudinally in the chamber one within the other, an exhaust pipe with an opening, a coupling over the exhaust pipe and having a branch leading from the opening, a valve associated with said branch, a conductor, means operatively connecting the conductor with the coils, a fan located in the chamber at the front ends of the coils.

3. An apparatus of the class described for heating automobiles comprising an elongated chamber, a coil longitudinally in the chamber, a fan at the front end of the chamber, couplings extending into the chamber and receiving the terminals of the coil, a conduit connected with one coupling, a coupling about the exhaust pipe of an automobile and having a valve therein, and means for connecting the last mentioned coupling with the conduit.

4. A heating apparatus of the class described for automobiles comprising an open ended chamber, a coil disposed in the chamber, couplings extending into the chamber and receiving the terminals of the coil, a conduit connected with one coupling, a coupling disposed about the exhaust pipe of an automobile and having a valve therein, and means for connecting the last mentioned coupling with the conduit.

In testimony whereof we affix our signatures.

HARLAN M. SMITH.
JOHN W. FARMER.